United States Patent [19]

Deck

[11] Patent Number: 5,711,610

[45] Date of Patent: Jan. 27, 1998

[54] BEARING ASSEMBLY FOR LINEAR BEARING SLIDE

[75] Inventor: Howard C. Deck, Henrietta, N.Y.

[73] Assignee: Optical Gaging Products, Inc., Rochester, N.Y.

[21] Appl. No.: 804,720

[22] Filed: Feb. 21, 1997

[51] Int. Cl.$^6$ ............................................. F16C 29/04
[52] U.S. Cl. ............................................. 384/49
[58] Field of Search ............................ 384/49, 18, 47, 384/19, 37

[56] References Cited

U.S. PATENT DOCUMENTS

| | | | |
|---|---|---|---|
| 3,003,827 | 10/1961 | Hentschke | 384/49 |
| 4,196,944 | 4/1980 | Simatovich | 384/49 |
| 5,320,430 | 6/1994 | Kobayashi | 384/49 |

*Primary Examiner*—Lenard A. Footland
*Attorney, Agent, or Firm*—Shlesinger, Fitzsimmons & Shlesinger

[57] ABSTRACT

Each assembly includes spaced bearings which roll independently of each other on and between confronting, parallel bearing surfaces which form an elongate raceway between a support member and a slide member that reciprocates thereon. Adjacent bearings are separated by coiled compression spring devices which permit the bearings to move relative to one another, but which also provide a minimum separation distance between adjacent bearings. Oil-saturated felt members are located between certain of the bearings to have sliding, wiping engagement with the bearing surfaces; and positioned at each end of an assembly is either a cylindrically shaped plastic end member, or a short keeper strip containing additional rotatable bearings and another oil-saturated felt member. When the slide member reaches one of its limit positions, one of the end members engages a stop plate at the end of the raceway, so that if any undesirable bearing migration has occurred, the spring closest to the stop plate is compressed and forces the remaining springs and bearings toward their centered positions, thus avoiding any restricted travel of the slide member.

12 Claims, 2 Drawing Sheets

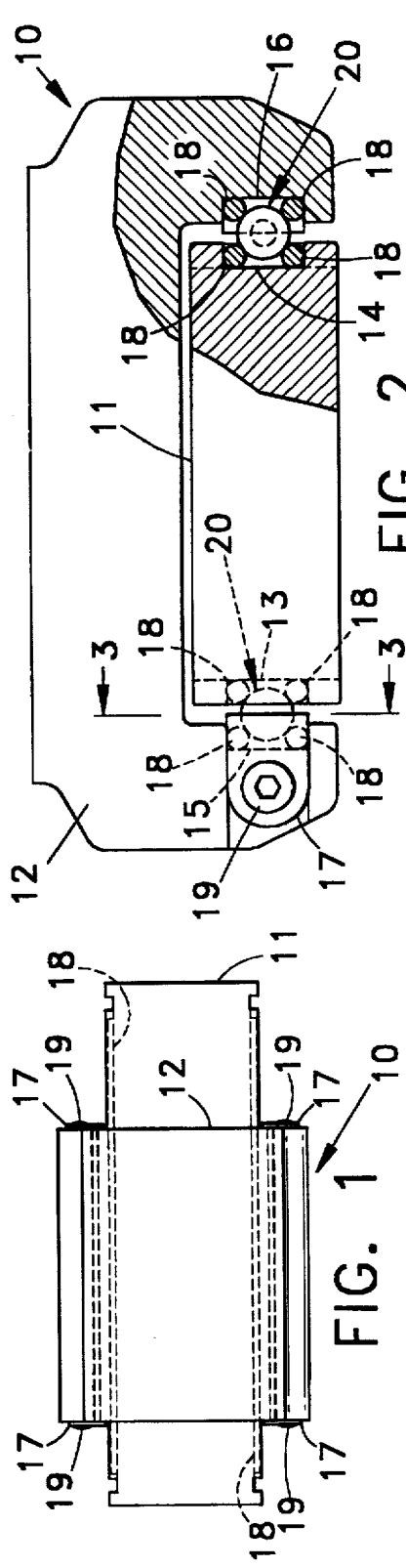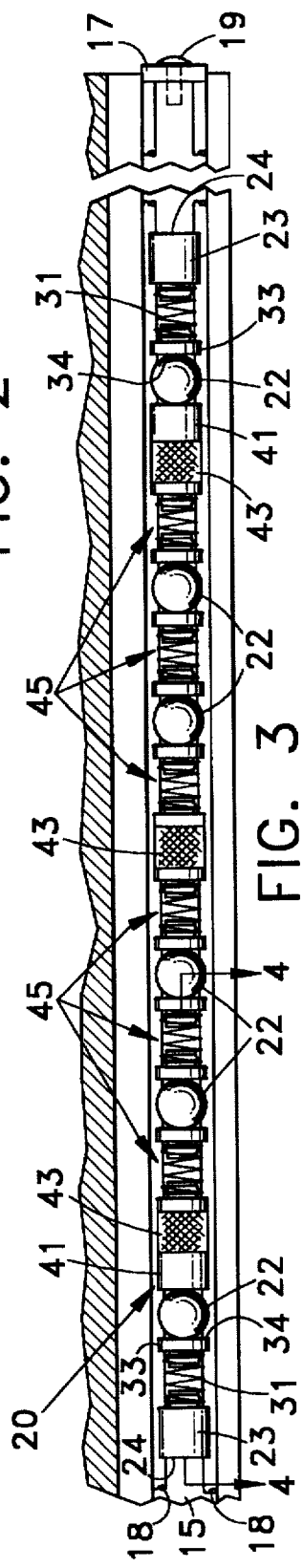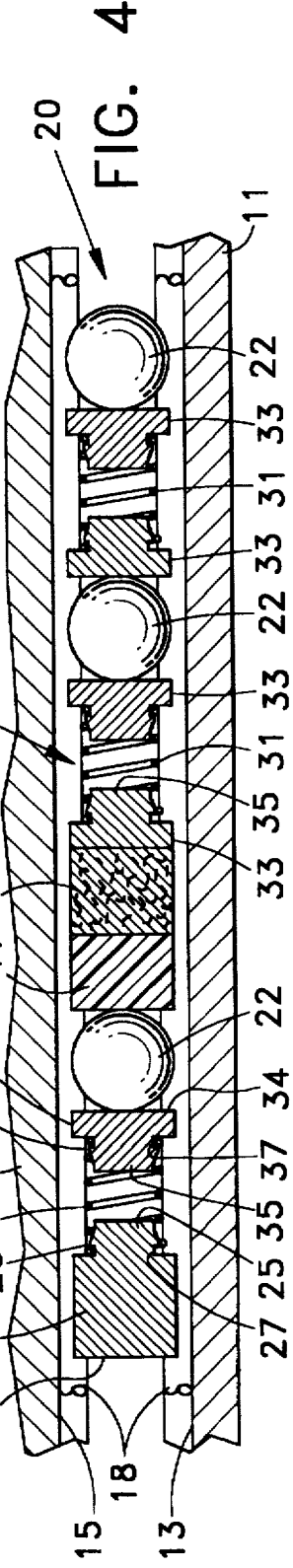

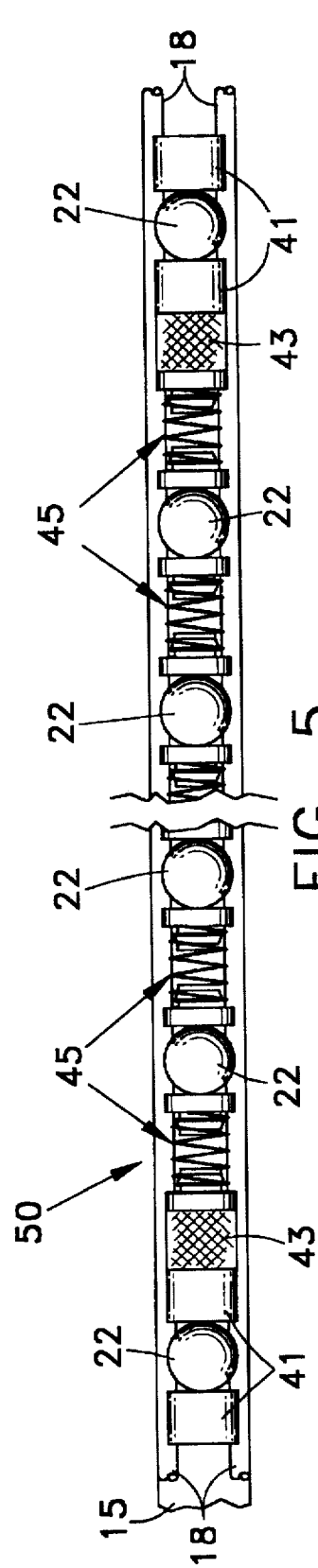
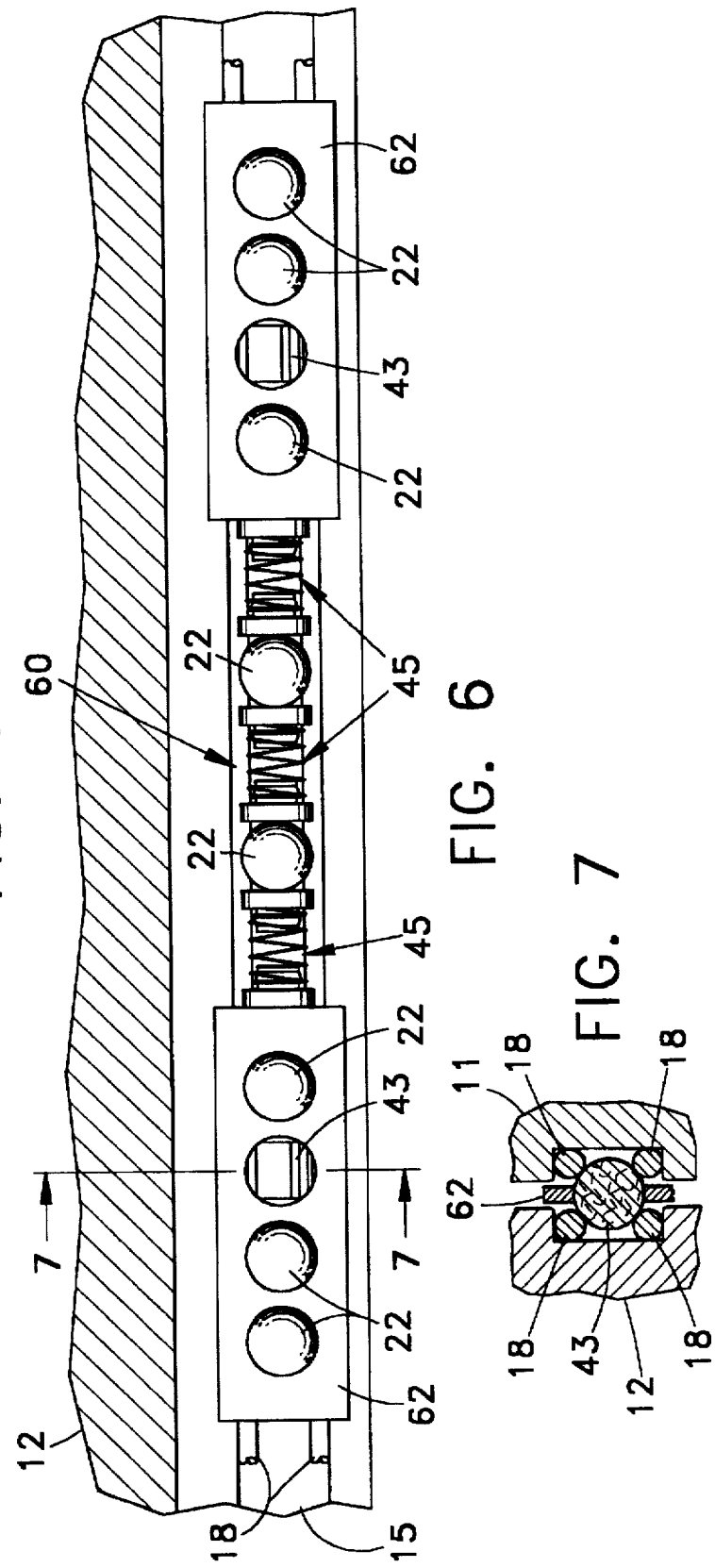
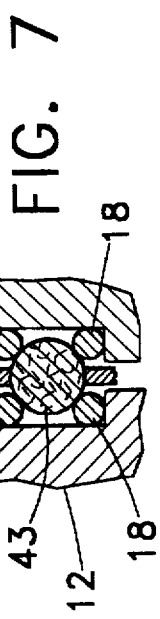

BEARING ASSEMBLY FOR LINEAR BEARING SLIDE

BACKGROUND OF THE INVENTION

This invention relates to linear bearing slides, and more particularly to improved bearing assemblies or ball tracks therefor which substantially eliminate undesirable migration of the bearings in the associated assembly, and which enables elimination of conventional ball keepers.

It has long been conventional to employ in linear bearing slides of the type described two sets of antifriction ball or roller bearings, which are mounted adjacent opposite sides, respectively, of a slide or table to support it for linear movement relative to an associated bed or support. Typically each s&t of bearings is mounted in a keeper strip, which maintains the bearings of a given set in predetermined, spaced relation to each other. When the slide is moved repeatedly over short distances, however, each set of bearings and its associated keeper strip tend to migrate to one end of the slide, thereby restricting its range of travel. When this occurs the positions of a keeper and its associated bearings must be reset by forcing and skidding the bearings until the keeper is recentered equidistantly from opposite ends of the slide when the slide is positioned centrally on the associated support. This tendency of the bearings and associated keeper to migrate depends upon many factors, such as for example the amount of preload of the bearings, and the weight of the bearings and keeper combination.

It is an object of this invention, therefore, to provide for linear bearing slides of the type described improved bearing assemblies which substantially eliminate any undesirable migration of the bearings employed in connection with such slide.

Another object of this invention is to provide for linear bearing slides a novel bearing assembly which operates without the use of a conventional ball keeper, and allows the associated bearings to float or shift to random locations relative to each other.

A more specific object of this invention is to provide for slides of the type described improved sets of bearings, each of which sets comprises a plurality of spaced bearings, springs and oil-saturated felt cylinders for minimizing skidding and prolonging the life of the bearings.

Other objects of the invention will be apparent hereinafter from the specification and from the recital of the appended claims, particularly when read in conjunction with the accompanying drawings.

SUMMARY OF THE INVENTION

Each of two bearing assemblies, which support a slide member for linear movement on a support member, include spaced bearings which roll on and between two spaced, parallel sets of elongate bearing rods which form a respective raceway between the members. Adjacent bearings are separated by coiled compression springs which permit the bearings to float or move relative to one another, but which also provide a minimum separation distance between bearings. Cylindrically shaped, oil-saturated felt members are included in each assembly between certain of the bearings to have sliding, wiping engagement with the bearing rods. Positioned at each end of each assembly is a cylindrically shaped plastic end member, or a short keeper strip of conventional design supporting therein in fixed relation to each other additional bearings and another oil-saturated felt member.

Whenever the slide member reaches one of its limit positions, one of the end members, or one of the two keeper strips of an assembly, will engage one of the stop or retaining plates which overlap opposite ends of each raceway. If any undesirable bearing migration has occured, the spring immediately adjacent or closest to the stop plate is compressed, and the force created by the compressed spring is transmitted to the assembly's remaining springs and bearings, which thus tend to return toward their centered positions, thus avoiding any restricted travel of the slide member because of bearing migration.

THE DRAWINGS

FIG. 1 is a plan view of a linear bearing slide having incorporated therein an improved bearing assembly made according to one embodiment of this invention;

FIG. 2 is an enlarged end view of this bearing slide with portions thereof cut away and shown in section;

FIG. 3 is an enlarged, fragmentary sectional view taken along the line 3—3 in FIG. 2 and looking in the direction of the arrows, and showing in greater detail an improved bearing assembly made according to one embodiment of this invention;

FIG. 4 is an enlarged, fragmentary sectional view taken generally along the lines 4—4 in FIG. 3 looking in the direction of the arrows;

FIG. 5 is a fragmentary sectional view generally similar to that shown in FIG. 3, but illustrating a modified form of the improved bearing assembly;

FIG. 6 is an enlarged, fragmentary sectional view similar to that shown in FIG. 3, but illustrating still another embodiment of this improved bearing assembly; and FIG. 7 is a fragmentary sectional view taken generally along the line 7—7 in FIG. 6 looking in the direction of the arrows.

PREFERRED EMBODIMENTS OF THE INVENTION

Referring now to the drawings by numeral of reference, and first to the embodiment shown on FIGS. 1 to 4, 10 denotes generally a linear ball slide comprising an elongate base or support member 11 having slidably mounted thereon a slide member 12 which is of inverted, generally U-shaped configuration in cross section. The base section 11 is generally rectangular in cross section and has formed in its opposed side surfaces similarly shaped and longitudinally extending grooves 13 and 14, which are rectangular in cross section. These grooves 13 and 14 confront upon similarly shaped grooves 15 and 16, which are formed in the inside surfaces of the downwardly extending furcations or laterally spaced leg sections of the slide member 12, and which overlie and are disposed in spaced, confronting relation to the longitudinally sending side surfaces of base member 11. Mounted in conventional manner in each of the grooves 13 through 16, and supported by bearing assemblies of the type noted hereinafter in spaced, parallel relation to each other in the bottoms of the associated grooves, are two, elongate, cylindrical bearing rods 18 of conventional design. The rods 18 in grooves 13 and 14 are held against longitudinal movement in base member 11 by shoulders which are formed on member 11 at opposite ends of the respective grooves 13 and 14; and rods 18 in the grooves 15 and 16 in slide member 12 are held against axial movement relative to the slide member by retaining plates 17, which are secured over opposite ends of the respective grooves 15 and 16 by screws 19.

As thus far described, the base member 11 and slide member 12 and the bearing rods 18 mounted therein as described above, are of conventional design, and are generally similar to the slide mechanism as disclosed in U.S. Pat. No. 3,113,807. However, unlike the prior art, the respective sets of bearing rods 18 are retained in spaced, parallel relation to each other in their respective grooves by novel bearing assemblies which are denoted generally in FIGS. 2 to 4 by the numerals 20. Since the assemblies 20 are the same for each side of slide 10, only the assembly shown at the left side of FIG. 1 is described in detail hereinafter.

Each of the bearing assemblies 20 comprises a plurality of axially spaced ball bearings 22 which have rolling engagement with their associated bearing rods 18, which in the case of those shown in FIGS. 3 and 4 are located in the confronting grooves 13 and 15, respectively. Opposite ends of the assembly 20 are delineated by two, like, cylindrically-shaped end members 23 the peripheral surfaces of which have sliding engagement with the flanking bearing rods 18, which thus maintain the end members 23 coaxially of each other, and of the intervening bearings 22. Intregral with and projecting coaxially from the inner end of each end member 23 is a reduced-diameter cylindrical shank section 25, which has formed thereon intermediate its ends a cylindrical shoulder 26 of slightly larger diameter, thus forming an annular recess 27 in each end member 23 intermediate the ends thereof.

Each of two, like, coiled compression springs 31 is secured at one end thereof in the recess 27 in one of the end members 23, and at its opposite end is secured as noted hereinafter to one of two cylindrical spacer members 33. Each spacer member 33 is generally similar in configuration to the associated end member 23, and has its peripheral surface slidably engaged with the flanking bearing rods 18. Also, although each member 33 is similar in diameter to that of the associated end member 23, its axial length is shorter than that of member 23. The inner end of each member 33 remote from its associated end member 23 has thereon a plane, flat surface 34 that extends parallel to the surface 24 of the associated member 23. Each member 33 has projecting coaxially from its opposite end a reduced-diameter shank section 35 which, like section 25 of member 23, has intermediate its ends a circumferential shoulder 36 forming on each member 33 an annular recess 37 in which is seated the end of the spring 31 opposite to that which is attached to the associated end member 23. In this way each of the elongate end members 23 is connected by one of the compression springs 31 with a shorter, spacer member 33. However, each pair of attached members 23 and 33 is also axially slidable relative to the flanking bearing rods 18.

As shown on FIG. 3, the plane, flat inner end 34 of each spacer member 33 is engaged coaxially with an adjacent ball bearing 22; and each such ball bearing 22 is engaged coaxially at its opposite side with one of the planar, transverse ends of a cylindrically-shaped, plastic spacer member 41. Each member 41 has a diameter approximately equal to that of the adjacent bearing 22, and has its peripheal surface disposed in sliding engagement with the flanking bearing rods 18, which in turn support each member 41 for sliding axial movement coaxially of the associated assembly 20. The opposite end of each member 41 is disposed in coplanar engagement with one end of an oil-saturated felt cylinder, which has a diameter similar to that of spacer 41, and the peripheral surface of which also is disposed to have sliding engagement with the flanking bearing rods 18. Interposed between the opposite, inner end of each of the two foregoing felt cylinders 43, and the next adjacent bearing 22 in an assembly 20, is a spring-coupled set (two) of the short spacer members 33. As shown in FIG. 4 the shank sections 35 of each such member confront upon and are interconnected to each other by a spring 31. In the drawings these sets are denoted generally by the numerals 45.

As shown in FIG. 3, except for the two outermost ball bearings 22 in an assembly 20, each of the remaining ball bearings 22 is sandwiched between two sets 45 of the spring-coupled spacers 33. Also, a further oil-saturated felt cylinder 43, which is positioned medially of the assembly 20, is positioned between and engaged at opposite ends thereof by one end each of the two innermost sets 45 of spacers, the opposite ends of which engage the two innermost bearings 22 of the assembly.

During operation of the above-described linear ball slide, when the slide member 12 is moved toward one end of the base member 11, the associated bearing assemblies 20 likewise travel in the same direction but generally move only approximately half the linear distance of the slide member. Thereafter when the slide member is returned to its mid position on the support member, ideally the associated bearing assembies are also returned to positions medially of the slide member and the base member. However, after repeated movement of the slide member, the ball bearings of the associated assemblies, which periodically tend to slip or slide relative to the associated bearing rods, tend to cause the assembly to migrate toward one end or the other of the slide member. In the case of conventional slides of the type which employ ball keeper strips for maintaining equal separation of the ball bearings in a respective assembly, the position of the associated keeper, and hence the ball bearings supported thereby, is reset after migration by forcing and skidding the keeper and balls until the assemblies are recentered relative to the slide member.

With the present invention, however, it has been discovered that by employing assemblies 20 of the type described above, the various parts of the assembly are not rigidly maintained in predetermined spaced relation to each other, but instead are allowed to float or shift into random locations relative to each other linearly of their associated races. In other words, the springs 31 in each assembly 20 act as spacers or keepers which determine only the minimum separation between the bearings 22 of each assembly. The springs 31 can compress and provide a force to restore or return the ball bearings 22 toward their original or centered positions upon migration thereof to one end or the other of the slide member. For example, when the various parts of an assembly 20 become separated because of ball bearing migration, when one end of the assembly (one of the end members 24) engages one of the end stops or retaining plates 17, which overlie opposite ends of a respective bearing raceway and its associated assembly 20, the force of the engagement of an end plate 24 with one of the plates 17 causes the adjacent spring 31 to be compressed. In turn, that compressed spring applies force via the associated spacer 33 to the first ball bearing 22 at that particular end of an assembly. This force is transmitted to the other ball bearings in the assembly via the remaining springs 31 that are connected in series with the first-mentioned spring, thus tending to shift each ball in the assembly back toward its start or centered position. As a consequence, the ball bearings 22 of each assembly 20 are free to shift axially of the associated ball bearing race independently of one another, but always separated from each other at least a minimum distance by the keeper springs 31.

The purpose of the several oil-saturated felt cylinders 43 in each assembly 20 is to provide a lubricant which is applied or wiped onto to the flanking bearing rods 18 as the associated assembly 20 travels back and forth in its associated raceway. The plastic cylinders 41 are interposed between the outermost bearings 22 and the two outermost felt cylinders 43 to provide full surface contact with the felt, a contact surface for the adjacent bearing 22, and also to serve, generally, as a means to control the overall length of a bearing assembly 20 employing standard length components. The two spacers or end members 23, which are substantially longer than the short spacer members 33, are employed at opposite ends of a respective assembly 20 to provide guiding alignment for the associated end member, so that when it contacts one of the end plates 17 it will not pivot off axis and jamb or pop out of position.

From the foregoing it will be apparent that the above-noted bearing assemblies 20 provide a novel means which enables the spring-coupled members 23 and 33 to replace rigid keepers of the type heretofore employed. The resilient springs 31 permit the various ball bearings in an assembly thereof to float or shift into random locations relative to each other, but nevertheless provide also a resilient force which, when the respective assembly becomes engaged with one of the end plates 17, functions to shift the bearings back toward their centered positions relative to the slide member, thereby substantially eliminating problems heretofore encountered as a result of the migration of ball bearings fixed in spaced relation to each other by conventional keeper strips. Moreover, by utilizing the oil-saturated felt cylinders 43, the associated bearing rods 18 are repeatedly and automatically coated with a thin film of oil, thereby greatly increasing the life of the system, and minimizing the ball skidding friction.

Referring now to FIG. 5, wherein like numerals are employed to denote elements similar to those employed in the first embodiment, 50 denotes generally a modified bearing assembly which is generally similar to that shown in the first embodiment, except that the two end springs 31 at opposite ends, respectively, of an assembly 20, and their attached end members 24 and short spacer members 33 are replaced by plastic cylinder guides, such as the cylinder guides 41 shown in the first embodiment. This construction has the effect of removing the two end springs 31 from the outermost ball bearings 22 in the assembly, and allows a respective end plate 17, when engaged by one of the cylinders 41 at one end of the assembly, to transmit a skidding force to the adjacent bearing 22 as the driving force behind the slide member 12 continues.

Referring now to FIGS. 6 and 7, wherein like numerals are employed also to illustrate elements similar to those employed in the first embodiment, 60 denotes generally still another modified bearing assembly comprising a pair of spaced ball keeper strips 62 of generally conventional design, which are located at opposite ends, respectively of the assembly. Each strip 62 has therein four spaced openings, three rotatably supporting ball bearings 22, and the fourth having secured therein a cylindrical, oil-saturated felt member 43 similar to that referred to in the preceding embodiments. Interposed between the two spaced keepers 62 for axial movement in the raceway formed between the two sets of bearing rods 18 is a plurality of ball bearings 22 (two in the embodiment illustrated) separated from each other and from the keepers 62 by the spring-coupled spacer sets 45. In this construction, therefore, the two, spaced keeper elements 62 are free to float independently of each other, and axially of the associated raceway, as are the two ball bearings 22 and three spacer sets 45 that are located between the two keepers 62. When the assembly 60 reaches one end or the other of its travel, and the outer end of one of its keepers 62 engages one of the end plates 17, the respective keeper 62 commences to compress the spacer set 45 which is engaged with the inner end thereof, and through that spacer set transmits force longitudinally and resiliently to the remainder of the assembly, including the keeper 62 at the opposite end of the assembly, thus tending to return the assembly toward its centered position. During such movement, of course, the oil-saturated cylinders 43, the peripheral surfaces of which slide on the flanking bearing rods 18, tend to keep those bearing rods lubricated.

From the foregoing it will be apparent that the present invention provides a relatively simple and inexpensive means for substantially eliminating problems normally resulting from bearing migration, such as restriction of the range of travel of a slide member. With the present invention, the spring coupled spacer members 33 which separate the associated ball bearings, tend to transmit to the associated bearings a resilient force which tends to return the bearings to a centered position each time one end or the other of the assembly engages an end plate during travel of the associated slide member. And although coiled compression springs 31 have been employed with spacers 33 between adjacent bearings, it will be apparent that any resiliently compressive members capable of performing similar functions can be employed in place of the coiled springs. Moreover, such spring coupled members could be employed also with assemblies which utilize roller rather than ball bearings. Also, while this invention has been illustrated and described in detail in connection with only certain embodiments thereof, it will be apparent to one skilled in the art that the invention is capable of still further modification, and that this application is intended to cover any such modifications as may fall within the scope of one skilled in the art, or the appended claims.

I claim:

1. In a linear bearing slide assembly of the type including a slide member mounted for linear movement on an elongate support member, said members having thereon confronting bearing surfaces forming therebetween at least one elongate bearing raceway, an improved bearing assembly in said raceway, comprising a pair of spaced end members mounted in said raceway for movement longitudinally thereof upon movement of said slide member relative to said support member, a plurality of spaced bearings mounted in said raceway between said end members for rolling engagement with said confronting bearing surfaces and for movement independently of each other upon said movement of said slide member relative to said base member, and a plurality of spaced, resiliently compressive devices slidably mounted in said raceway in alternation with at least certain of said spaced bearings, and operative to establish a minimum distance separating adjacent ones of said certain bearings upon movement of said slide member on said support member.

2. In a linear bearing slide assembly as defined in claim 1, wherein at least one of said end members comprises a cylindrically shaped piece of plastic having a peripheral surface disposed coaxially of said raceway and in sliding engagement with said bearing surfaces upon movement of said slide member on said support member.

3. In a linear bearing slide assembly as defined in claim 1, wherein at least one of said end members comprises an elongate keeper plate having a plurality of spaced bearings rotatably mounted in spaced openings therein to have rolling engagement with said bearing surfaces.

4. In a linear bearing slide assembly as defined in claim 3, including at least one lubricating member secured in a further opening in said keeper plate, said lubricating member having oil-saturated surfaces disposed in sliding engagement with said bearing surfaces upon movement of said slide member relative to said support member.

5. In a linear bearing slide assembly as defined in claim 1, including a plurality of spaced lubricating members mounted in said raceway between said end members, and said lubricating members having oil-saturated surfaces disposed in sliding engagement with said bearing surfaces upon movement of said slide member relative to said support member.

6. In a linear bearing slide assembly as defined in claim 5, including a cylindrically shaped plastic spacer member mounted in said raceway adjacent each end of each of said lubricating members, each of said spacer members having thereon a plane transverse surface having coplanar engagement with a like surface on the adjacent lubricating member.

7. In a linear ball bearing slide assembly as defined in claim 5, wherein one of said lubricating members is located approximately medially of said assembly, and two others of said lubricating members are located adjacent opposite ends, respectively, of said assembly.

8. In a linear bearing slide assembly as defined in claim 1, wherein each of said resilient devices comprises a coiled compression spring, and a pair of cylindrically shaped spacer members secured to and overlying opposite ends, respectively, of said spring coaxially thereof, and having sliding engagement with said bearing surfaces.

9. In a linear bearing slide assembly as defined in claim 8, wherein each of said spacer members has projecting coaxially from one end thereof a reduced-diameter shank portion which projects coaxially into one end of the respective coiled spring to which the spacer is secured.

10. In a linear bearing slide assembly as defined in claim 9, wherein two of said devices are located at opposite ends, respectively, of said assembly, and one of said pair of cylindrically shaped spacer members of each of said two devices is longer than the other member of the pair and constitutes one of said end members of the assembly.

11. In a linear bearing slide assembly as defined in claim 10, wherein the other of the pair of spacer members of each of said two devices is engaged with one of said bearings.

12. In a linear ball bearing slide assembly as defined in claim 9, wherein each of said coiled springs has an outside diameter less than the diameter of each of said cylindrically shaped spacer members.

\* \* \* \* \*